(12) United States Patent
Suligoj et al.

(10) Patent No.: US 12,361,256 B2
(45) Date of Patent: Jul. 15, 2025

(54) RFID ASSEMBLY AND TAG AND METHOD OF MANUFACTURING A PRODUCT USING THE SAME

(71) Applicant: ASSA ABLOY AB, Stockholm (SE)

(72) Inventors: Eric Suligoj, Froideville (CH); Christian Mirus, Fribourg (CH)

(73) Assignee: ASSA ABLOY AB, Stockholm (SE)

( * ) Notice: Subject to any disclaimer, the term of this patent is extended or adjusted under 35 U.S.C. 154(b) by 0 days.

(21) Appl. No.: 18/466,258

(22) Filed: Sep. 13, 2023

(65) Prior Publication Data

US 2024/0104333 A1 Mar. 28, 2024

(30) Foreign Application Priority Data

Sep. 19, 2022 (EP) .................................... 22196267

(51) Int. Cl.
G06K 19/077 (2006.01)
(52) U.S. Cl.
CPC .............................. G06K 19/07773 (2013.01)
(58) Field of Classification Search
CPC ............................................... G06K 19/07773
USPC ......................................................... 235/492
See application file for complete search history.

(56) References Cited

U.S. PATENT DOCUMENTS

| | | |
|---|---|---|
| 2007/0052613 A1 | 3/2007 | Gallschuetz et al. |
| 2007/0148981 A1 | 6/2007 | Rogge |
| 2008/0074272 A1 | 3/2008 | Stobbe et al. |
| 2008/0314982 A1 | 12/2008 | Stobbe et al. |
| 2009/0096583 A1 | 4/2009 | Kanda et al. |
| 2010/0032487 A1 | 2/2010 | Bohn et al. |
| 2011/0006959 A1* | 1/2011 | Menko ...................... H01Q 1/38 29/601 |
| 2015/0300043 A1* | 10/2015 | van Buynder ........ E05B 47/063 70/393 |
| 2016/0321479 A1* | 11/2016 | Uhl ..................... G06K 7/10346 |
| 2017/0155306 A1* | 6/2017 | Zhu ......................... H02K 11/21 |
| 2018/0268278 A1* | 9/2018 | Spinks .................... G06K 19/04 |
| 2020/0184291 A1* | 6/2020 | Tisdel .............. G06K 19/07758 |
| 2021/0166100 A1 | 6/2021 | Bühler et al. |

FOREIGN PATENT DOCUMENTS

| | | |
|---|---|---|
| EP | 0977145 | 2/2000 |
| WO | 2020249240 | 12/2020 |

OTHER PUBLICATIONS

"European Application Serial No. 22196267.3, Extended European Search Report mailed Feb. 23, 2023", 8 pgs.
"European Application Serial No. 22196267.3, Response Filed Sep. 18, 2024 to Extended European Search Report mailed Feb. 23, 2023", 6 pgs.

* cited by examiner

*Primary Examiner* — Allyson N Trail
(74) *Attorney, Agent, or Firm* — Schwegman Lundberg & Woessner, P.A.

(57) ABSTRACT

An RFID assembly (10) includes an RFID chip (14) having a coupling loop (15) formed as part of the RFID chip (14). In this manner, the RFID chip (14) can be inductively coupled to a far-field antenna (16) for RFID communications, without any physical connections between the RFID chip (14) and the coupling loop (15) and/or the far-field antenna (16). This results in a high temperature resistance of the RFID assembly (10), which can be advantageously used, in particular, during tracking of parts in assembly processes requiring higher temperatures.

20 Claims, 3 Drawing Sheets

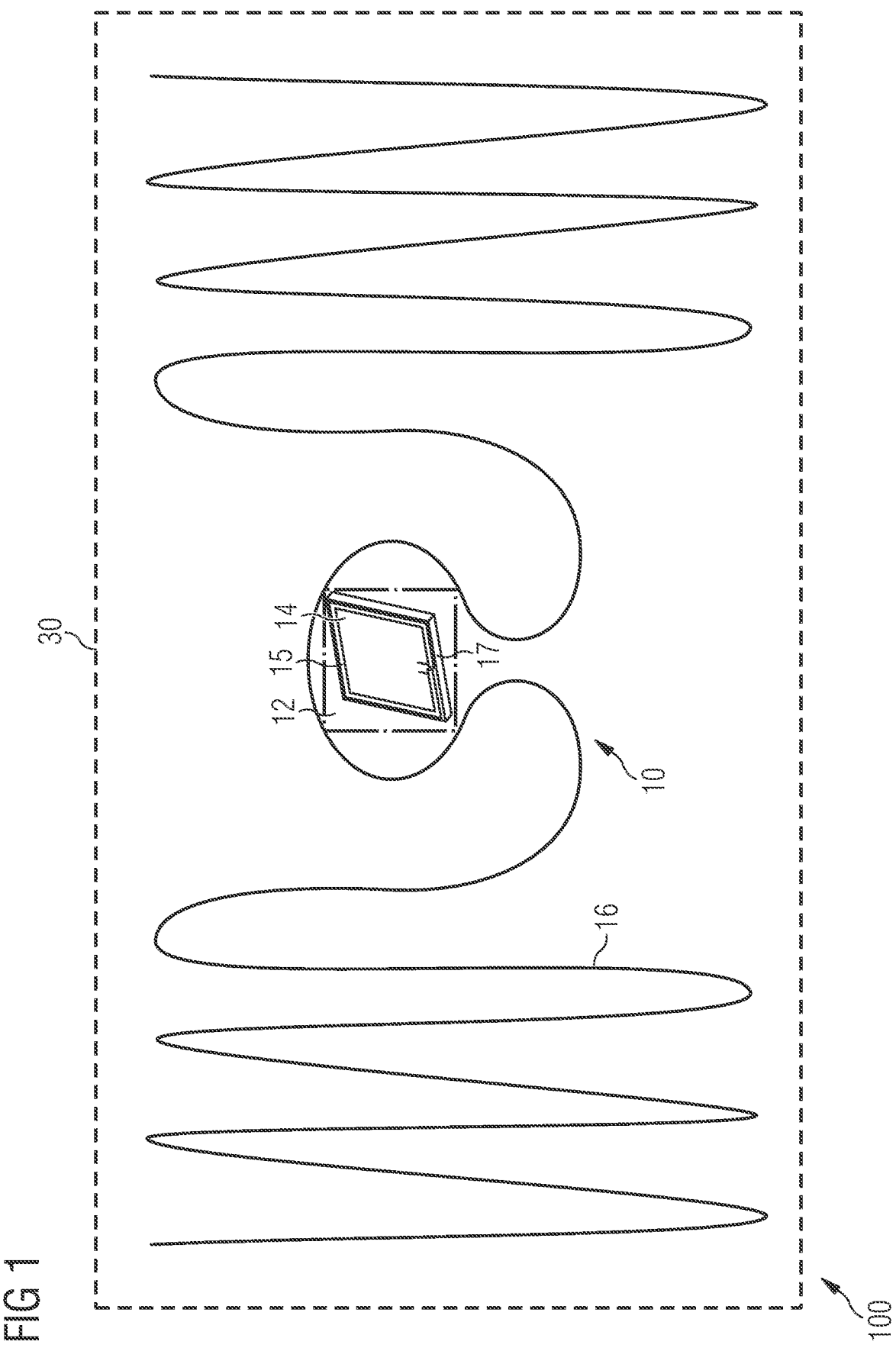

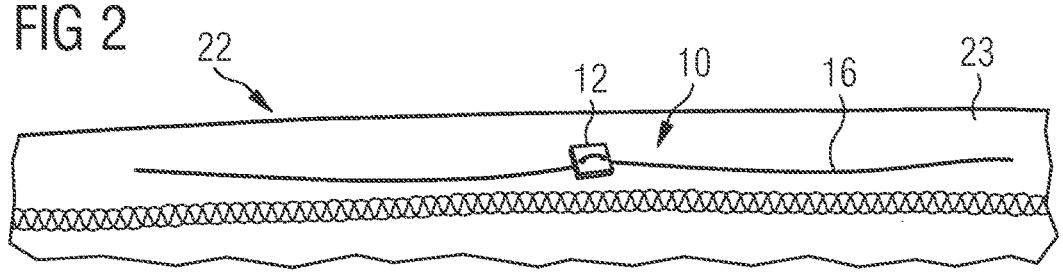
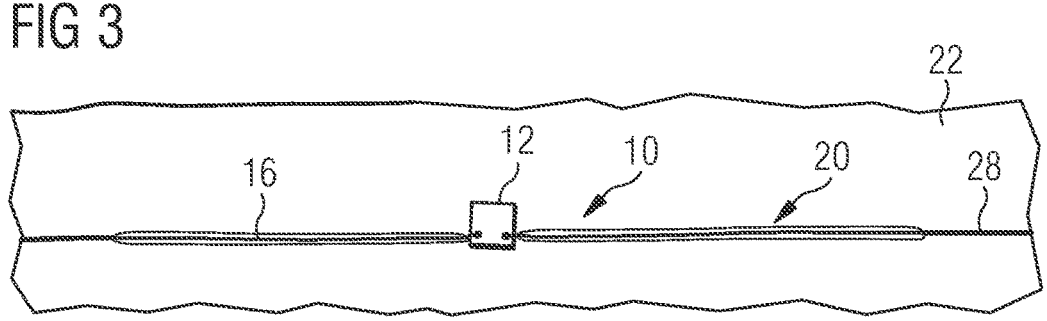
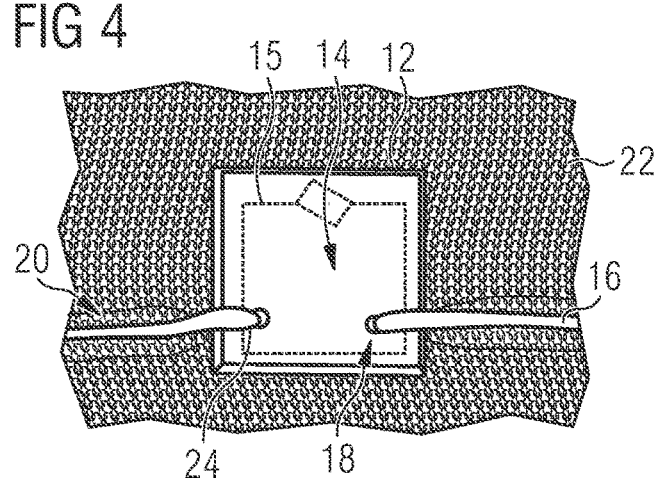
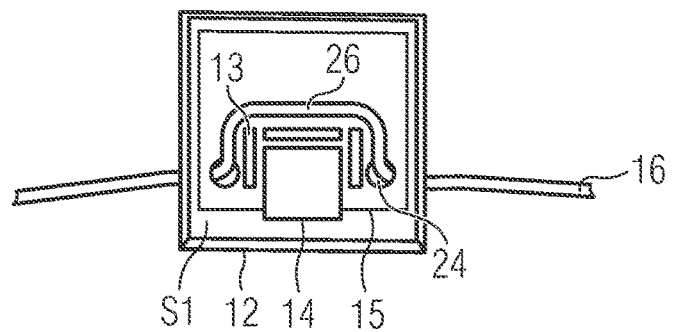

# RFID ASSEMBLY AND TAG AND METHOD OF MANUFACTURING A PRODUCT USING THE SAME

CROSS-REFERENCE TO RELATED APPLICATION(S)

This application claims priority to EP Patent Appl. No. 22196267.3, titled "RFID Assembly and Tag and Method of Manufacturing a Product Using the Same," filed Sep. 19, 2022, which is hereby incorporated by reference herein in its entirety.

TECHNICAL FIELD

The present disclosure generally relates to radio frequency identification (RFID) devices, in particular, to an RFID assembly and an RFID tag and a method of manufacturing a product using the same.

BACKGROUND

Generally, RFID devices such as, for example, RFID cards, RFID tags, etc. include an RFID antenna and an integrated circuit connected to the RFID antenna. Upon presence of an electromagnetic field emitted by a reader device, the RFID antenna supplies energy from the electromagnetic field to the integrated circuit, which integrated circuit may communicate with the reader device using radio frequency (RF) communication protocols. In this manner, for example, data can be read from a memory associated with the integrated circuit, and can also be written into said memory, if desired.

WO 2020/249240 A1 discloses an RFID device that can be connected to a piece of material, in particular, a piece of fabric. A wire antenna is coupled to an integrated circuit provided on a substrate of the RFID device. The integrated circuit is configured to be inductively coupled to the wire antenna via a coupling loop provided on the substrate and electrically connected to the integrated circuit.

The present disclosure is directed, at least in part, to improving or overcoming one or more aspects of prior systems.

SUMMARY OF THE DISCLOSURE

According to one aspect of the present disclosure, an RFID assembly, in particular, a high-temperature RFID assembly, comprises an RFID chip configured to be mounted on a substrate, the RFID chip including an integrated circuit forming (i.e., being configured as) a coupling loop (i.e., a coupling antenna), and a far-field antenna inductively coupled to the coupling loop to allow the RFID chip to perform RFID communications via the far-field antenna and the coupling loop.

According to another aspect of the present disclosure, an RFID tag comprises a tag housing, and the RFID assembly of the above aspect accommodated in the tag housing.

According to a further aspect, the present disclosure relates to a method of manufacturing a product comprising one or more parts. The method comprises attaching the RFID assembly or the RFID tag of the above aspects to at least one of the one or more parts.

Other features and aspects of the present disclosure will be apparent from the following description and the accompanying drawings.

BRIEF DESCRIPTION OF THE DRAWINGS

FIG. 1 is a schematic overview of a high-temperature RFID assembly in accordance with the present disclosure;

FIG. 2 is a plan view of an exemplary RFID assembly provided on a piece of fabric;

FIG. 3 is a plan view of the RFID assembly connected to the piece of fabric;

FIG. 4 is a detailed view of a substrate of the RFID device in FIG. 2;

FIG. 5 is a bottom view of a substrate of an exemplary RFID assembly in accordance with the present disclosure;

DETAILED DESCRIPTION

Figure 6:
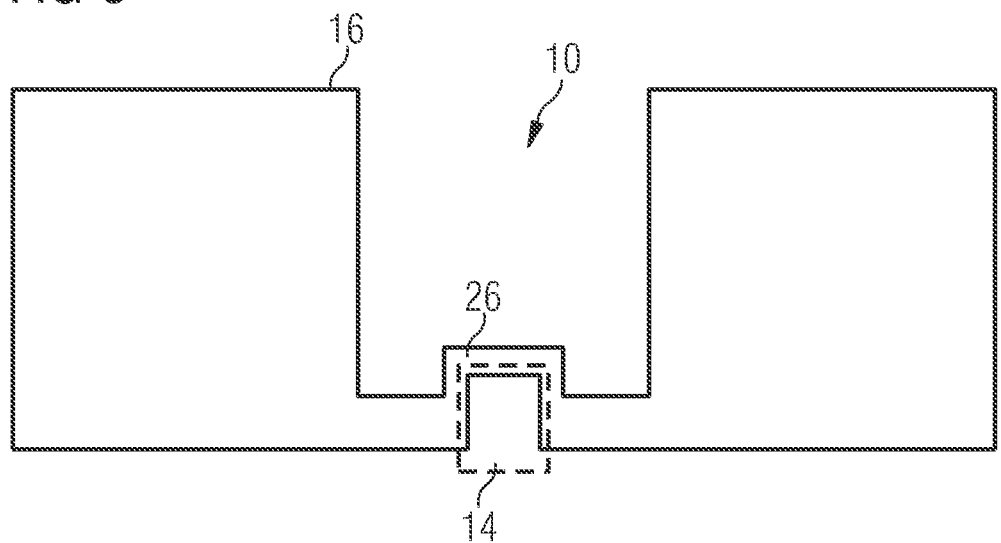
FIG. 6 is a schematic plan view of another exemplary RFID assembly in accordance with the present disclosure.

The following is a detailed description of exemplary embodiments of the present disclosure. The exemplary embodiments described herein are intended to teach the principles of the present disclosure, enabling those of ordinary skill in the art to implement and use the present disclosure in many different environments and for many different applications. Therefore, the exemplary embodiments are not intended to be, and should not be considered as, a limiting description of the scope of protection. Rather, the scope of protection shall be defined by the appended claims.

The present disclosure is based at least in part on the realization that high-temperature tag solutions that are currently used are generally based on a complicated and expensive construction. Such high-temperature tag solutions may have limited thermal resistance and life time, or require insulation to reduce the effects of high temperatures. In particular, if such high-temperature tags are subjected to repeated cycles at very high temperatures and/or temperature gradients, the intermetallic connection between the RFID chip and its external antenna can be deteriorated. This is due to the so-called battery effect in case of two different materials, for example, copper wires connected via gold bumps, etc. Another issue is a thermal coefficient mismatch between the different materials, such as the RFID chip, the antenna, the substrate, the packaging, or the like, which may result in thermal stress.

It has been realized that the above problems can be solved by providing an RFID assembly in which there is no physical electrical connection between the RFID chip and the antenna. This can be achieved by providing an inductive coupling between the far-field antenna and a coupling antenna or loop that is provided as part of the RFID chip. In other words, in accordance with the present disclosure, the RFID chip is not electrically connected to an external antenna, but includes a coupling loop that is formed as part of the integrated circuits of the RFID chip. Here, it will be appreciated that the term "chip" as used herein has the meaning that is commonly understood by the skilled person, i.e., microelectronic circuitry formed on a die, typically a semiconductor material, which die is then commonly provided on an external support (referred to as "substrate" herein). In other words, an integrated circuit or a chip that is mounted on a substrate, and electrically connected to an antenna also mounted on the substrate and external to the chip is not to be considered as an RFID chip in accordance with the present disclosure, which includes an integrated circuit forming a coupling loop or antenna. Instead, the skilled person will appreciate that the coupling loop of the RFID chip is formed on the same in a manner that is commonly used to form the electronic circuits or structures on the die of the chip. Examples for such methods include, for example, etching, photolithography, chemical vapor deposition, and any other known chip manufacturing techniques.

The present disclosure is also based at least in part on the realization that, by providing a contactless connection or coupling between the RFID chip and the far-field antenna, the product life can be increased due to better resistance to higher temperatures, and furthermore, the complexity of the RFID assembly and an RFID tag including the same can be reduced, which results in reduced costs and also allows for reducing the tag size.

In particular, it has been realized that, with the present disclosure, high-temperature tags can be obtained that can be used during taxing manufacturing conditions, for example, at high temperatures, such as during manufacturing cycles where temperatures are higher than, for example, 150° C., such as in a range between 150° C. and 250° C., or even between 250° C. and 350° C. Further, the high-temperature RFID assembly can withstand such temperatures for an extended period of time of up to 20 minutes or even 50 minutes per cycle. This is of particular advantage during manufacturing of, for example, automobiles, where at least parts of the automobile may be subjected to high temperatures, for example, during application of a varnish or the like. In this case, the information that is provided on the RFID chip can be reliably protected, which is crucial for manufacturing of the finished product without problems.

Referring now to the drawings, FIG. 1 shows a schematic overview of a high-temperature RFID assembly 10 in accordance with the present disclosure. RFID assembly 10 comprises a substrate 12, and an RFID chip 14 configured to be mounted on substrate 12. RFID chip 14 includes an integrated circuit formed on a die 17 in a known manner and, in particular, forming a coupling loop or antenna 15 on die 17. For example, coupling loop 15 may include a plurality of turns, such as three turns. As previously mentioned, coupling loop 15 is a structure that is formed as part of RFID chip 14 on die 17 of the same, using any appropriate chip manufacturing technique such as, for example, chemical vapor deposition or the like. As such, coupling loop 15 forms part of the micro-electronics of RFID chip 14, which has a commonly used chip structure.

RFID chip 14 may be mounted on substrate 12 in any appropriate manner that is commonly used for mounting chips on a substrate, for example, by bonding using adhesives, by soldering, or the like. In some embodiments, substrate 12 may not be part of RFID assembly 10, but may instead be part of an article or product to which RFID assembly 10 (in particular, RFID chip 14) is mounted.

As shown in FIG. 1, RFID assembly 12 further comprises a far-field antenna 16 that is inductively coupled to coupling loop 15 of RFID chip 14. Due to this inductive coupling, far-field antenna 16, together with coupling loop 15, allows RFID chip 14 to perform RFID communications via far-field antenna 16 and coupling loop 15. The manner in which such RFID communications are performed is well-known, such that a detailed description will be omitted. In the same manner, it will be appreciated that RFID chip 14 includes circuitry that provides RFID chip 14 with all functions that are commonly used by an RFID chip, in particular, one or more memory units for storing information, programs, etc., a microcontroller or the like configured to execute such programs in order to perform RFID communications, and so on.

In the example shown in FIG. 1, far-field antenna 16 is illustrated as a meandering wire having a substantially symmetrical configuration, including a loop-like section that extends at least in part around RFID chip 14 with coupling loop 15. In this manner, an efficient inductive coupling between far-field antenna 16 and coupling loop 15 can be obtained. Of course, as also explained below, far-field antenna 16 can have any appropriate configuration, as long as the desired communications via the same can be performed in desired frequency ranges and with the desired communication distances.

It will be appreciated that far-field antenna 16 does not necessarily have to be provided on or attached to substrate 12. In other words, far-field antenna 16 may not be physically connected to substrate 12 in some embodiments. For example, far-field antenna 16 could be provided on a separate substrate that is combined or assembled with substrate 12, or far-field antenna 16 could be provided separately from substrate 12, for example, printed or otherwise attached to an article or product, and substrate 12 (or RFID chip 14 without substrate 12) could be mounted to the article or product (e.g., provided in a cavity formed therein, or otherwise attached to the same). In other embodiments, however, far-field antenna 16 may be physically connected to substrate 12, for example, by being attached to the same, as will be described in more detail below, or by being provided on a surface of substrate 12, for example, the same surface on which RFID chip 14 is mounted. In the latter example it will be appreciated that substrate 12 will have an appropriate size such that both RFID chip 14 and far-field antenna 16 can be provided on the same.

Substrate 12 preferably has characteristics which result in a high temperature resistance of the same, and also prevent an application of significant thermal stress to RFID chip 14 via substrate 12 in case of higher temperatures or temperature gradients. For example, substrate 12 may be made of metal, such as a lead frame or metal sheet or the like made of, for example, copper, copper alloy, iron-nickel alloy, or the like. In other embodiments, however, substrate 12 may be non-metallic, for example, a temperature-resistant resin, wood, glass or the like. Specific examples include a polyimide (PI) substrate, a liquid crystal polymer (LCP) substrate, an aramid fabric, PEEK, and the like.

In particular in the case of far-field antenna 16 being attached to or mounted on substrate 12, far-field antenna 16 is preferably electrically insulated from substrate 12, for example, by providing an appropriate insulation layer or the like between the same.

It will be appreciated that the integration of coupling loop 15 into RFID chip 14 allows for a compact unit including the RFID chip and the antenna. In some embodiments, RFID chip 14 may have a size that is between 0.1 mm$^2$ and 25 mm$^2$, for example, between 1 mm$^2$ and 4 mm$^2$. It will be appreciated, however, that this is only exemplary, and that any sizes that can be obtained using common chip manufacturing methods can be employed, if desired.

In some embodiments, RFID assembly 10 is configured to perform UHF communications within a range of, for example, at least 0.1 m, preferably up to 1 m or more. Configurations of far-field antenna 16 allowing for such communications are well-known, such that a detailed description will be omitted. In other embodiments, however, it will be appreciated that the RFID communications can be in other wavelength ranges, for example, HF communications, with a range that is considerably less than several m. Here, it will be appreciated that the configuration of far-field antenna 16, in particular, the size of the same, plays an important role in determining the properties, in particular, the range of communications that is available.

RFID chip 14 is mounted on substrate 12 via any appropriate method, for example, using an adhesive such as high-temperature tape, resin, or any other type of glue. Here, it will be appreciated that, for example, the adhesive also has to have a temperature resistance that results in a reliable connection between RFID chip 14 and substrate 12 at the expected temperatures of, for example, between 150° C. and 250° C., or between 250° C. and 350° C. As also shown in FIG. 1, in some embodiments, RFID assembly 10 may form part of an RFID tag 100 comprising a tag housing 30 and RFID assembly 10 accommodated in the same. Here, tag housing 30 may be formed of any appropriate material that can provide additional protection for RFID assembly 10, for example, a resin material or the like, LCP, PEEK, ceramics, glass, etc.

Referring to FIGS. 2 to 5, a first exemplary embodiment of RFID assembly 10 will be described, in which RFID assembly 10 is connected to a piece of material 22, for example, a piece of clothing or the like. In the example shown in FIGS. 2 to 5, substrate 12 includes an attachment portion 18 for attaching far-field antenna 16 to substrate 12. This will be described in more detail in the following.

FIG. 2 shows a plan view of the exemplary first embodiment of RFID assembly 10 in accordance with the present disclosure. As shown in FIG. 2, RFID assembly 10 comprises substrate 12 and far-field antenna 16 configured to be connected to piece of material 22. In the exemplary embodiment, the piece of material is a fabric, more particularly, a piece of clothing having a hem 23. For the sake of illustration, RFID assembly 10 is shown in FIG. 2 as being arranged on top of hem 23. In practice, however, RFID device may be embedded in hem 23 after being attached. As shown in FIG. 2, far-field antenna 16 extends from substrate 12 on opposite sides of the same in a substantially linear manner. In particular, RFID assembly 10 is configured to be arranged on piece of material 22 in such a manner that it extends substantially parallel to hem 23, such that RFID assembly 10 can be embedded into hem 23 in a known manner after having been connected to piece of fabric 22. Such techniques for embedding are well-known and will therefore not be described herein.

As shown in more detail in FIGS. 3 and 4, RFID assembly 10 comprises RFID chip 14 mounted on substrate 12 in a known manner. Further, far-field antenna 16 is coupled to RFID chip 14 to allow RFID chip 14 to perform RFID communications via far-field antenna 16. RFID chip 14 is configured to be inductively coupled to far-field antenna 16 via coupling loop 15 formed on RFID chip 14. Further, as shown in FIG. 4, far-field antenna 16 is attached to substrate 12 via an attachment portion 18 of substrate 12. In the exemplary embodiment, attachment portion 18 includes a pair of through holes 24 formed in substrate 12, and far-field antenna 16 is passed through the pair of through holes 24 to extend from opposite sides of substrate 12, as shown in FIG. 4. In the exemplary embodiment, the pair of through holes 24 is formed on opposite sides of substrate 12, at a position adjacent to two corner portions of substrate 12 provided on one side of substrate 12. Of course, it will be appreciated that the pair of through holes can be provided at any appropriate position of substrate 12, at least as long as it can be assured that a coupling portion 26 (see FIG. 5) of far-field antenna 16 that extends across the substrate between the pair of through holes 24 can be inductively coupled to RFID chip 14.

As shown in FIG. 3, far-field antenna 16 includes a connecting portion 20 configured to be connected to piece of material 22 in a state of being attached to substrate 12. In particular, connecting portion 20 may include a coating 28 of far-field antenna 16. Coating 28 is provided in at least one portion of far-field antenna 16 and is configured to be fixedly connected to piece of material 22. In the exemplary embodiment shown in FIG. 3, coating 28 is provided over the entire length of far-field antenna 16. This has the advantage that far-field antenna 16 can be easily attached to substrate 14, without having to make sure that a coated portion of the same has a specific positional relationship with respect to substrate 12 and/or piece of material 22. However, in other embodiments, only part of far-field antenna 16 may be covered by coating 28.

In the present example, coating 28 may include a thermoset adhesive material, for example, a thermoset PU material, and far-field antenna 16 may be configured to be connected to piece of material 22 via heating of the portion of coating 28 including the coating with the thermoset adhesive material. This is shown in FIG. 3, where portions of far-field antenna 16 adjacent to substrate 12 are shown in a state of being connected to piece of material 22 after having been heated in an appropriate manner. Attachment of thermoset adhesive materials to, in particular, pieces of fabric, for example, in a known patching process, are well-known, such that the description will be omitted. It is evident from FIG. 3 that, with the portions of far-field antenna 16 adjacent to substrate 12 being connected to (fused with) piece of material 22, due to the fact that far-field antenna 16 is attached to substrate 12 via through holes 24 (see FIG. 4), substrate 12 is also connected to piece of material 22 via far-field antenna 16 in this manner. Therefore, substrate 12 does not need to have a further connecting portion for connecting substrate 12 to piece of material 22. This greatly simplifies the connection of RFID assembly 10 to piece of material 22.

As shown in FIG. 5, in the example described above, attachment portion 18 includes the pair of through holes 24 formed in substrate 12, and far-field antenna 16 is attached to substrate 12 by being passed through the pair of through holes 24 from a first side S1 of substrate 12 (in FIG. 5, S1 corresponds to the bottom side of substrate 12). Further, as previously mentioned, far-field antenna 16 includes coupling portion 26 extending across substrate 12 between the pair of through holes 24. In some embodiments, substrate 12 may include a guide portion 13, for example, one or more ribs or the like, configured to guide coupling portion 26 on substrate 12. In this manner, it can be assured that coupling portion 26 has a desired positional relationship with respect to RFID chip 14, more particularly, coupling loop 15. It should be mentioned that piece of material 22 is omitted from FIG. 5 for the sake of illustration. In this manner, far-field antenna 16 can be reliably coupled to RFID chip 14. It will be appreciated that the single coupling loop 15 shown in FIG. 5 is only exemplary, and coupling loop 15 may include a plurality of turns, for example, two or three turns.

While in the example shown in FIG. 4 coupling portion 26 extends substantially straight between the pair of through holes 24, it will be appreciated that, in other embodiments, coupling portion 26 may at least partly surround RFID chip 14. For example, an appropriate guide portion 13 may be provided to guide coupling portion 26 accordingly, for example, to extend between through holes 24 as three sides of a rectangular shape, as shown in FIG. 5.

In some embodiments, guide portion 13 may be provided to cover at least part of coupling portion 26 provided on the substrate 12. For example, guide portion 13 as shown in FIG. 4 may include one or more additional ribs and a top portion (not shown) provided over coupling portion 26 and connecting the ribs of guide portion 13. In this case, far-field antenna 16 can be inserted through a passage formed in guide portion 13.

The coating may be formed from, for example, PU or a similar material, and may be configured to connect far-field antenna 16 to piece of fabric 22 by being heated to a temperature in a range between 190° C. and 220° C., or between 230° C. and 250° C., or even higher temperatures due to the high temperature resistance of RFID assembly 10.

In the above example, far-field antenna 16 is configured as a linear dipole antenna. However, it will be readily appreciated that far-field antenna 16 may have any appropriate configuration that allows for RFID communications between RFID assembly 10 and an external reader device. For example, a support layer (not shown) may be provided, on which far-field antenna 16 having a desired arrangement (for example, one or more meanders) is arranged prior to being connected to piece of material 22, and the support layer may be removed during or after connection of far-field antenna 16 to piece of material 22.

Although in the example described above connecting portion 20 includes a pair of through holes 24, it will be appreciated that, in other embodiments, only a single through hole or several pairs of through holes 24 may be provided. Also in this case, far-field antenna 16 may be inserted through through hole 24, and mounting portions 20 of far-field antenna 16 may then be connected to piece of material 22, for example, by heating in the above-described manner.

In addition, although in the above-described example far-field antenna 16 is attached to substrate 12 by being inserted through through holes 24, in other embodiments, far-field antenna 16 may be attached to substrate 12 in a different manner, for example, by welding or the like. In other embodiments, far-field antenna 16 and substrate 12 may be integrally provided, for example, on a support layer similar to the one mentioned above. However, also in this case, substrate 12 can be connected to piece of material 22 via far-field antenna 16, for example, by the above-described connection of mounting portion 20, by heating coating 28 of far-field antenna 16 in a state in which the same is attached to substrate 12. In some embodiments, an appropriate engagement portion can be provided on substrate 12, for example, a clamping portion or the like for engaging a portion of far-field antenna 16.

Further, although mounting portion 20 has been described above as a coating 28 that fixedly connects far-field antenna 16 to piece of fabric 22, in other embodiments, different mounting portions including, for example, clamping portions, Velcro strips, pins etc. can be provided for far-field antenna 16 to fixedly or detachably connect far-field antenna 16 to piece of material 22. In other embodiments, far-field antenna 16 may be connected to piece of material 22 by ultrasonic welding or the like, or may be stitched to piece of material 22.

In the above-described first exemplary embodiment, far-field antenna 16 is attached to substrate 12 on which RFID chip 14 is mounted. However, in other embodiments, as will be described in the following with respect to FIG. 6, far-field antenna 16 may form at least part of substrate 12. For example, as shown in FIG. 6, far-field antenna 16 may have two extended antenna portions, for example, formed as extended metallic sheet portions arranged symmetrically and connected to each other by coupling portion 26, which is formed as a metallic section having a reduced width. In this case, RFID chip 14 (or substrate 12, if present) may be directly mounted or bonded to far-field antenna 16, for example, to coupling portion 26 such that coupling portion 26 at least partially surrounds RFID chip 14 and its coupling loop 15. In this manner, an even more compact RFID assembly 10 can be achieved, where RFID chip 14 may be connected to far-field antenna 16 using any known chip-mounting techniques. Far-field-antenna 16, to which RFID chip 14 is mounted in the above-described manner, can then be conveniently provided on an article or a product that is to be provided with RFID assembly 10. Here, it will again be appreciated that any appropriate method may be used to attach RFID assembly 10 to an article or a product, for example, by laminating far-field antenna 16 and/or substrate 12, if present, with one or more layers of the article or product, bonding to the article or product using an adhesive, welding or any other appropriate technique.

Figure 7:
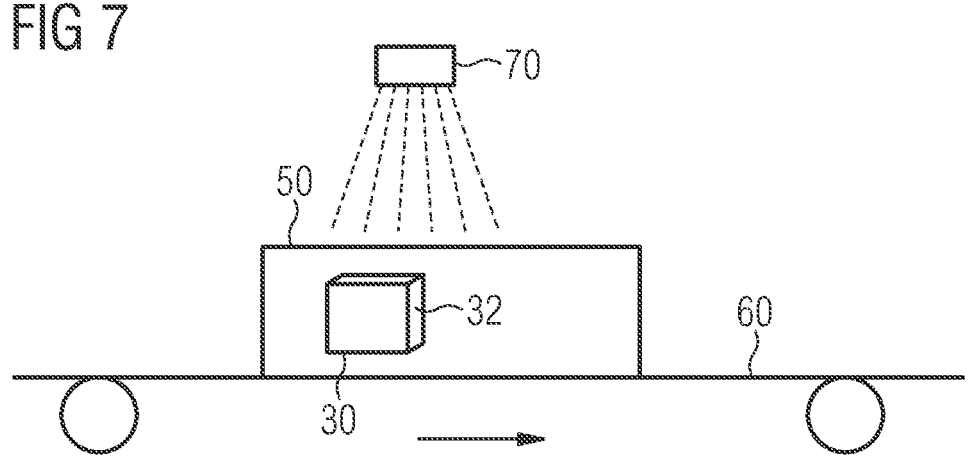
FIG. 7 is a schematic view illustrating an exemplary method of manufacturing a product in accordance with the present disclosure.

FIG. 7 shows an exemplary RFID tag with tag housing 30 attached to a workpiece or part 50, for example, during a manufacturing process. As shown in FIG. 7, tag housing 30 includes a tag attachment portion 32 configured to attach tag housing 30 to part 50, for example, by means of an adhesive or the like. For example, tag housing 30 may be attached using a fastener such as one or more screws or rivets, by stitching, using a heat seal or a clip solution. Further details of an exemplary method of manufacturing a product comprising one or more parts 50 will be described in the following.

INDUSTRIAL APPLICABILITY

As described above, with the RFID assembly according to the present disclosure, a high-temperature RFID assembly can be obtained in a simple and cost-efficient manner, due to the absence of any physical (electrical) connections between the RFID chip and an external (coupling) antenna. This is achieved by providing the coupling antenna as part of the integrated circuitry of the RFID chip, and inductively coupling the same to a far-field antenna.

The attachment of either RFID assembly 10 as described above, or RFID tag 100, which includes tag housing 30 accommodating RFID assembly 10, to a part or article allows for secure management and tracking of the part or article, in particular, during manufacturing processes. Of course, it will be appreciated that the present disclosure is not limited to an application for such manufacturing processes, but can be used in any application in which RFID tags are commonly used, with the additional advantage of the high-temperature resistance of such an RFID tag. Nevertheless, in the following, one example with respect to a process or method of manufacturing a product consisting of one or more parts will be described.

For example, during manufacturing of a product comprising a plurality of parts 50, for example, an automobile or the like, the method disclosed herein includes a step of attaching RFID assembly 10 or RFID tag 100 to at least one of parts 50 that form the product. For example, as schematically shown in FIG. 7, tag housing 30 may be attached to part 50, which forms part of the finished product, such as an automobile chassis. It will be appreciated that, during manufacturing of such a complicated product, part 50 is subjected to many different processes, some of which may involve the use of high temperatures during extended periods of time. For example, part 50 may be part of the manufactured automobile while a chassis of the same is provided with a varnishing, which is commonly performed at temperatures of more than 200° C., and for an extended period of time. During or after application of the varnish, for example, by a spray device 70, part 50 may be transported via a conveyor 60 to a subsequent stage of the manufacturing line. Here, it will be appreciated that RFID chip 14 included in tag housing 30 may store any relevant information that is required for manufacturing of the product, for example, detailed specifications of the finished product, a color of a varnishing to be applied, and the like. It will be appreciated that the information on RFID chip 14 may be read using conventional RFID readers in a known manner, and may be appropriately modified by said readers, if desired.

After the manufacturing process has been completed, it will be appreciated that RFID assembly 10 or RFID tag 100 may be removed from part 50, and may be used during manufacturing of a further product. In this manner, the RFID assembly and RFID tag disclosed herein can be repeatedly used over a large number of production cycles. For example, due to the high temperature resistance, RFID chip 14 and the associated RFID assembly or tag may be configured to withstand temperatures of at least 150° C. or 220° C., preferably 230° C. to 250° C., more preferably 250° C. to 350° C., for at least 20 minutes, preferably up to 1 hour, and for a large number of cycles, for example, between 500 and 3000 cycles, in particular, 1000 cycles. It will be appreciated that this results in a very high cost-effectiveness and a wide range of potential applications for the RFID assembly and tag disclosed herein. In particular, the RFID assembly and the RFID tag disclosed herein allow for a reliable tracking and management of parts 50 during a manufacturing process, or in any other application where a high durability and reliability even at high temperatures is required.

It will be appreciated that the foregoing description provides examples of the disclosed systems and methods. However, it is contemplated that other implementations of the disclosure may differ in detail from the foregoing examples. All references to the disclosure or examples thereof are intended to reference the particular example being discussed at that point and are not intended to imply any limitation as to the general disclosure.

Recitation of ranges of values herein are merely intended to serve as a shorthand method for referring individually to each separate value falling within the range, unless otherwise indicated herein, and each separate value is incorporated into the specification as if it were individually recited herein. All method steps described herein can be performed in any suitable order, unless otherwise indicated or clearly contradicted by the context.

Although the preferred embodiments of the present disclosure have been described herein, improvements and modifications may be incorporated without departing from the scope of the following claims.

The invention claimed is:

1. An RFID assembly comprising:
   an RFID chip configured to be mounted on a substrate, the RFID chip including an integrated circuit forming a coupling loop; and
   a far-field antenna inductively coupled to the coupling loop to allow the RFID chip to perform RFID communications via the far-field antenna and the coupling loop.

2. The RFID assembly of claim 1, further comprising the substrate, wherein the RFID chip is mounted on the substrate.

3. The RFID assembly of claim 2, wherein the far-field antenna is provided on a surface of the substrate.

4. The RFID assembly of claim 3, wherein the substrate is made of metal.

5. The RFID assembly of claim 3, wherein the far-field antenna is electrically insulated from the substrate.

6. The RFID assembly of claim 3, wherein the far-field antenna is provided on a same surface of the substrate on which the RFID chip is mounted.

7. The RFID assembly of claim 2, wherein the far-field antenna forms at least part of the substrate.

8. The RFID assembly of claim 2, wherein the RFID chip is mounted on the substrate via an adhesive.

9. The RFID assembly of claim 8, wherein the RFID chip is mounted on the substrate via at least one of a resin or high-temperature tape.

10. The RFID assembly of claim 2, wherein the substrate includes an attachment portion for attaching the far-field antenna to the substrate.

11. The RFID assembly of claim 10, wherein the far-field antenna includes a connecting portion configured to connect the far-field antenna to a piece of material in a state of being attached to the substrate.

12. The RFID assembly of claim 2, wherein the far-field antenna is attached to the substrate.

13. The RFID assembly of claim 1, wherein a size of the RFID chip is between 0.1 $mm^2$ and 25 $mm^2$.

14. The RFID assembly of claim 1, configured to perform UHF or HF communications within a range of at least 0.1 m.

15. The RFID assembly of claim 1, wherein the RFID chip is configured to withstand temperatures of at least 150° C. for at least 20 minutes.

16. The RFID assembly of claim 15, wherein the RFID chip is configured to withstand at least 500 cycles, each cycle comprising temperatures of at least 150° C. for at least 20 minutes.

17. An RFID tag comprising:
   a tag housing; and
   the RFID assembly of claim 1 accommodated in the tag housing.

18. A method of manufacturing a product comprising one or more parts, the method comprising:
   attaching the RFID assembly of claim 1 to at least one of the one or more parts; and
   tracking the at least one part using the RFID assembly during manufacturing.

19. The method of claim 18, further comprising processing at least one of the one or more parts at temperatures of 150° C. or more.

20. The method of claim 18, wherein the RFID assembly comprises a tag housing accommodating the RFID chip and the far-field antenna.

* * * * *